United States Patent [19]

Feldman

[11] Patent Number: 4,779,374
[45] Date of Patent: Oct. 25, 1988

[54] ANIMAL TRAPS

[76] Inventor: Clifford R. Feldman, 23 W. Terrace Rd., Great Neck, N.Y. 11021

[21] Appl. No.: 140,253

[22] Filed: Dec. 31, 1987

[51] Int. Cl.$^4$ ............................................. A01M 23/00
[52] U.S. Cl. ..................................................... 43/81
[58] Field of Search ................. 43/63, 81, 82, 83, 83.5, 43/99

[56] References Cited

U.S. PATENT DOCUMENTS

| | | | |
|---|---|---|---|
| 1,407,096 | 2/1922 | Spencer | 43/63 |
| 1,709,199 | 4/1929 | Thayer | 43/81 |
| 2,544,475 | 3/1951 | Uttz | 43/81 |
| 2,637,931 | 5/1953 | Sklar | 43/83 |
| 2,724,209 | 11/1955 | Cain | 43/83.5 |
| 3,769,742 | 11/1973 | Spain | 43/81 |
| 4,703,583 | 11/1987 | Dzurkovich et al. | 43/82 |

FOREIGN PATENT DOCUMENTS 24645 of 1905 United Kingdom ............... 43/63

*Primary Examiner*—Kurt Rowan
*Attorney, Agent, or Firm*—Collard, Roe & Galgano

[57] ABSTRACT

An animal trap is disclosed which includes a substantially planar baseboard. A first generally U-shaped jaw member is provided which has at least one free end thereof pivotally mounted to the baseboard about a pivot axis substantially parallel to the plane of the baseboard surface. A second generally U-shaped jaw member is provided which has at least one free end thereof pivotally mounted to the baseboard about the pivot axis. A spring is provided which cooperates between the baseboard and the first and second jaw members for urging the jaw members from the set position to the sprung position in which cross-bar section of the first jaw member engages the baseboard on one side of the pivot axis. The U-shaped second jaw member is larger in size than the first U-shaped jaw member and includes a bag extending between the parallel legs thereof. When the trap is in the set position the outer surface of the bag is adjacent to the baseboard and the inner surface of the bag is adjacent the first jaw member. The trap includes a conventional trigger device which is composed of a trigger-arm rod and a bait pedal. Upon triggering, the second jaw member follows the first jaw member, by the action of the spring, from the set position to the sprung position whereby any animal caught in the trap by the first jaw member is covered by the bag mounted on the second jaw member, and a floor extension connected to the baseboard of the animal trap.

10 Claims, 1 Drawing Sheet

ANIMAL TRAPS

BACKGROUND OF THE INVENTION

1. Field of the Invention

This invention relates to animal traps of the type generally used for individually trapping small rodents such as rats and mice. More specifically, the invention relates to a means whereby the rodent trapped by such trap is covered by a plastic bag so that the trapped animal does not have to be seen by the trapper and which plastic bag can be used for easy disposal of the rodent remains.

2. Description of the Prior Art

Animal traps, especially mousetraps, are very common and are of a generally well known design wherein a U-shaped sprung jaw is pivotally mounted to a baseboard and moves from the set position to the sprung position. A trigger arrangement for the trap generally takes a form of an elongated trigger arm or rod pivoted to one end of the baseboard and which extends, when the trap is set, over the cross-bar of the depressed jaw. The trigger arm extends across the jaw pivot axes with the free end of the arm releasably engaging a pivotal bait pedal on the opposite side of the jaw pivot axes. The bait pedal is generally centrally located with respect to the sprung position of the jaw and the arrangement is such that with the trap in a set condition, depression of the bait pedal by an animal releases the trigger arm allowing the jaw to swing over the central axes under the force of the spring and trap the animal against the baseboard.

Such a trap is generally shown in U.S. Pat. No. 4,245,423 which issued Jan. 20, 1981. Such traps are widely available and may be purchased at any number of stores. A major disadvantage of these prior art traps is that they are often utilized by individuals who view the act of trapping an animal as distasteful. This is even more so when these individuals must remove the dead, trapped animal from the trap as is necessary when there is a desire to reuse the trap.

In the trap of the present invention, a second generally U-shaped jaw member is provided which, while similar in shape to the first U-shape sprung jaw, is somewhat larger in size and includes a removeable plastic bag member. Upon triggering the trap, the second jaw follows the first U-shaped jaw member through its rotation from the set position to the sprung position and thereby covers any animal trapped by the first jaw member with the plastic bag. The bag is of sufficient size so that release of the jaw members with the trap in the inverted position allows the dead rodent to fall into the bag for easy disposal thereof. Thus, visual contact with the dead trapped animal is minimized.

SUMMARY OF THE INVENTION

It is an object to this invention to provide an improved animal trap in which each trapped animal is covered by a plastic bag.

It is yet another object of this invention to provide a mousetrap in which a plastic bag is used to shield the trapped animal from the view of the trapper, and which can be utilized to dispose of the remains thereof.

It is yet another object of this invention to provide a mousetrap which is simple in design, economical to manufacture and provides an inducement for use in that visual contact with any trapped rodent is minimized.

Accordingly, the present invention provides an animal trap including a device for covering the trapped animal and for providing easy disposal thereof. The animal trap is composed of a substantially planar baseboard and has a first generally U-shaped jaw member with the free ends thereof pivotally mounted to the baseboard about a pivot axis substantially parallel to the plane of the baseboard. A second generally U-shaped jaw member is provided which has at least one end thereof pivotally mounted to the baseboard means about the same pivot axes as the first jaw member. A coil spring is operative between the baseboard and the first and second jaw members urging these members towards a sprung position in which the cross-bar section of the first and second generally U-shaped jaw members engage the baseboard on the sprung side of the pivot axis. In this position the cross-bar section of the second jaw member extends beyond the cross-bar section of the first jaw member. The trap has a trigger arm for releasably maintaining the first and second jaw members in a set position, in opposition to the coil spring, wherein the cross-bar section of the first and second generally U-shaped jaw members are disposed in a set position adjacent to the baseboard on the opposite side of the pivot axis as the sprung side. A plastic bag is attached around the periphery of the U-shaped second jaw member and extends across the U-shaped opening formed thereby. The outer surface of the bag is adjacent the baseboard when the second jaw member is in the set position and the inner surface of the bag is adjacent to the first jaw member when that member is in the set position. The trigger arm is pivotally mounted on the baseboard on the side thereof opposite the sprung side and, when in the set position, extends through the bag and over the cross-bar section of the first U-shaped member, across the pivot axis with a free end of the trigger arm engaging a bait pedal. This assembly retains the first jaw member in the set position and, as is well known, the depression of the bait pedal releases the free end of the trigger arm to spring the trap. The coil spring has an extention portion capable of engaging both the first and second jaw member whereby release of the first jaw member by the trigger arm causes the second jaw member and the bag to follow the first jaw member by action of the coil spring from the set position to the sprung position. Consequently, any animal caught in the trap by the first jaw member is covered by the bag attached to the second jaw member and an extension floor which extends off on end of the trap.

These and other objects and advantages of the present invention will become apparent from the following description of the accompanying drawing, which discloses several embodiments of the invention. It is to be understood that the drawing is to be used for purposes of illustration only, and not as a definition of the invention.

DESCRIPTION OF A PREFERRED EMBODIMENT

Figure 1:
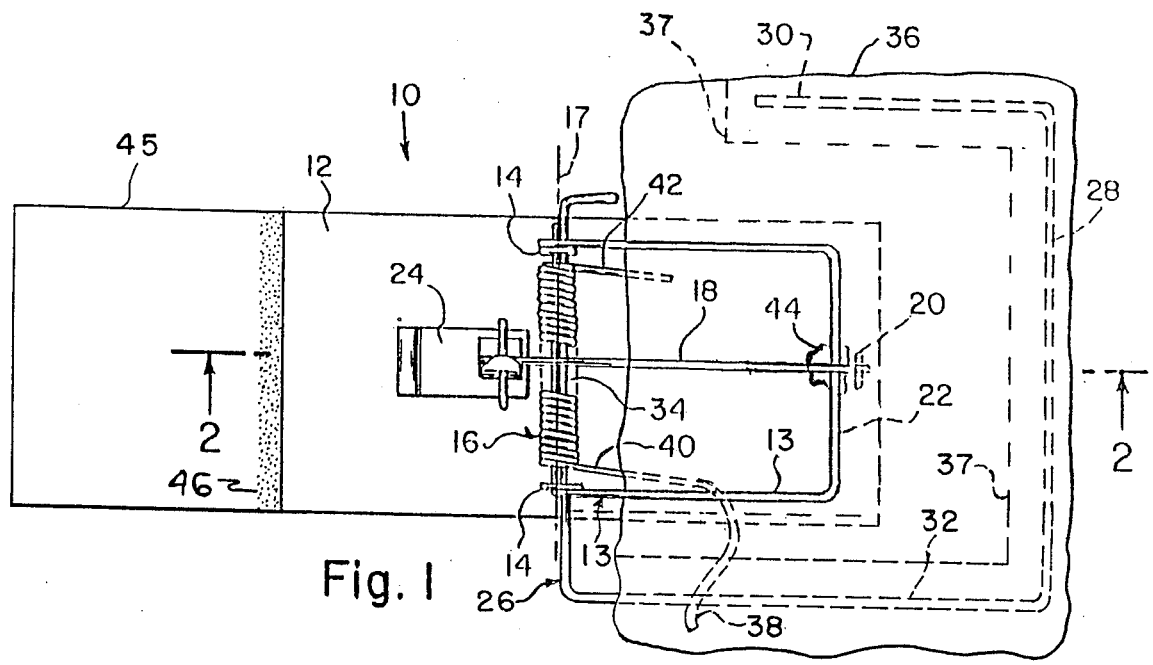
FIG. 1 is a plan view of the animal trap or mousetrap of the present invention with the jaws in the set position.
Figure 2:
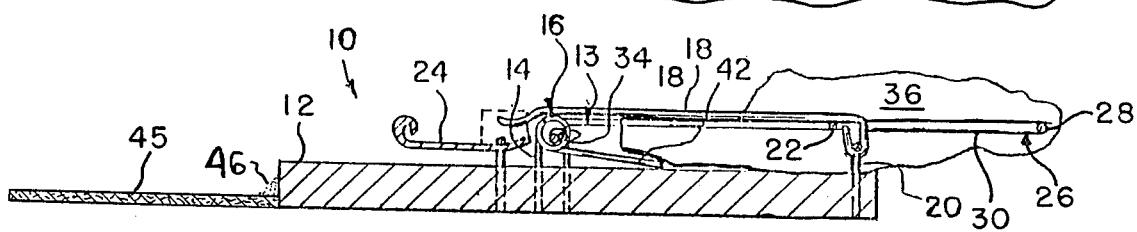
FIG. 2 is an elevation view of the trap shown in FIG. 1 in the unsprung position.
Figure 3:
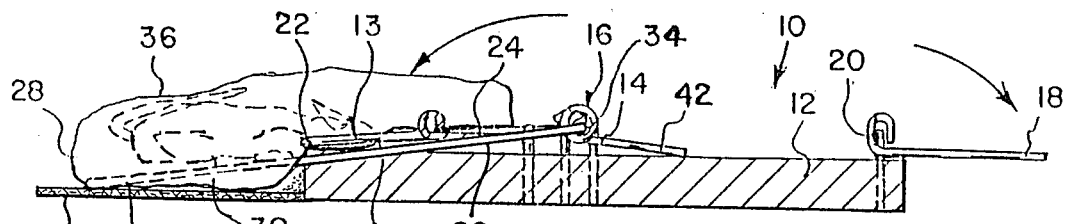
FIG. 3 is an elevation view of the trap of FIG. 1 in the sprung position with a rodent trapped thereon.

Referring to FIGS. 1-3, there is shown an animal trap generally denoted as 10 which includes, in a conventional manner, a wooden baseboard 12, a substantially U-shaped jaw 13 pivoted, at least at one free end thereof, to staples 14 attached to baseboard 2. At least one coil spring 16 urges jaw 13 towards its sprung position.

Coil spring 16 is disposed along an axis 17 which runs in a transverse direction across the trap 10. This axis is straddled by staples 14. A trigger mechanism comprising an elongated trigger arm or rod 18 is pivotally connected to baseboard 2 at staple 20 and which, in the set position of the trap illustrated in FIG. 1, extends over cross-bar 22 of jaw 13 with its free end releasably engaging a part of a pivotally mounted bait pedal 24.

It will be appreciated that the elements described above are conventional in this type of trap which operates in a like manner to known traps such that the trap is sprung by depression of the bait pedal from the position illustrated in FIG. 1. In accordance with the present invention, a second jaw 26 is provided which has certain distinct features as now will be described.

The jaw 26 has a generally U-shape and has at least one free end thereof pivotally mounted to the baseboard 12 via staples 14. The second U-shaped jaw member 26 overlies the first U-shaped jaw member 13 but is larger in both the longitudinal and transverse directions. The second jaw member 26 includes a cross-bar member 28 which extends crosswise with respect to the trap and parallel to axis 17 of coil spring 16. Jaw member 26 has legs 30 and 32 which extend perpendicular to axis 17. The jaw member 26 includes a cross-bar 34 which extends through the staples 14 and along axis 17 and within coil springs 16.

The jaw member 26 forms a support structure for a plastic bag 36. The jaw member 26 and bag 36 are sized to encompass the entire transverse width of the trap and to extend longitudinally beyond the end of a typical trap. The jaw and bag are sized to surround a typical rodent for which the trap is intended. Plastic bag 36 is preferably opaque so that the user cannot see the trapped rodent. In addition, bag 36 includes a fold 37 around the periphery thereof, which may be slid around the jaw member 26 starting at leg 30, then over cross-bar 28 and down leg 32 thereby fixing bag 36 securely on arm 26.

As shown in the figures, the animal trap also includes a rigid piece of material 45 constructed as a floor at the left end of the trap where jaw member 26 resides after the trap has been sprung. Floor member 45 is secured to the end of baseboard 12 by means of an adhesive 46 so that when plastic bag 36 surrounds the rodent after the trap has been sprung, floor 45 will cover the bottom of the bag to prevent the rodent from falling out. Since jaw member 26 touches floor 45 after the trap has been sprung, floor 45 is constructed of material that is sufficiently flexible to absorb the impact of jaw member 26 without breaking or snapping off.

An arm 38 extends from one end 40 of coil spring 16 and underlies both jaw member 13 and jaw member 26 when these jaw members are in the ready-to-spring or set position (shown in FIG. 1). The other end 42 of coil spring 16 is adapted to engage the top planar surface of the baseboard 12 to prevent uncoiling of coil spring 16 when it has been placed under tension. Bag 36 has an opening or slit 44 therethrough which allows trigger arm 18 to pass through bag 36 over cross-bar 22 of jaw member 13 across the axis 17 and to engage, in a well known manner, bait pedal 24. As is well known, the coil spring 16 is adapted to urge the jaw member 13 from the position shown in FIG. 1 to the position shown in FIG. 3 upon actuation of bait pedal 24 as when a rodent removes the bait therefrom. In this process, spring 16 via extension 38 provides the actuating force which moves jaw member 13 from the unsprung to a sprung position.

In the design of the present invention, extension 38 also underlies leg 32 of jaw member 26 and upon actuation of the trap, causes jaw member 26 to move with jaw member 13 to the position shown in FIG. 3. In this position, jaw 26 and plastic bag 36 overlie any trapped animal. In order to ensure the unimpeded movement of jaw member 13, the plastic bag 36 is positioned below jaw member 13 when the trap is in the set position shown in FIG. 1. Since cross-bar 28 of jaw 26 extends well beyond pivot point or staple 20 of trigger arm 18, it can be seen that the trigger arm then must extend through the bag 36 in order to overlie the cross-bar 22. In this manner, as the trap is triggered, the slit or opening 44 in plastic bag 36 allows trigger arm 18 to pass through bag 36 as jaw member 26 proceeds from the set position of FIG. 1 to the sprung position of FIG. 3.

While bag 36 is preferably made of plastic material, any suitable material can be used. In addition, while it is preferred to use material which is opaque, so that the covered rodent cannot be seen through the bag, a clear material could be used. Also, bag 36 is sized loosely so that not only can the rodent be covered when the trap is sprung, but the bag can engulf the entire animal to allow for easy disposal. In this regard, the arm 30 of jaw member 26 is not attached to cross-bar 34 and is preferably shorter than leg 32 to permit easy installation and removal of the bag as necessary. Floor 45 which forms an extension of baseboard 12 is preferably constructed of a cardboard or plastic material which is rigid, but which is slightly flexible to absorb the impact of jaw member 26 when the trap is sprung. It is preferably connected to baseboard 12 by means of an adhesive 46 which is deposited along the end of the baseboard. If necessary, floor 45 could overlap slightly the bottom of baseboard 12 and be stapled or cemented to the bottom of the baseboard. Floor means or floor 45 preferably extends slightly beyond jaw member 26 when the trap has been sprung so that its area is sufficient to cover the bottom of bag 36 after the rodent has been caught.

While several embodiments and examples of the present invention have been described and/or shown, it is obvious that many changes and modifications may be made thereunto, without departing from the spirit and scope of the invention.

What is claimed is:

1. An animal trap comprising:
   a substantially planar baseboard means;
   a first generally U-shaped jaw member having at least one free end thereof pivotally mounted to said baseboard means about a pivot axis substantially parallel to said plane of said baseboard means;
   a second generally U-shaped jaw member having at least one free end thereof pivotally mounted to said baseboard means about a pivot axis substantially parallel to said plane of said baseboard means wherein a cross-bar member of said second jaw member extends outwardly from said pivot axis a distance further than a cross-bar member of said first jaw member;

a spring means operative between said baseboard means and said first and second jaw members for urging said first and second jaw members from a set position towards a sprung position;

a trigger means for releasably maintaining said first jaw member in said set position in opposition to said spring means; and a bag means attached to said second generally U-shaped member, said bag means having one surface thereof adjacent said baseboard means and a second surface adjacent said first jaw member when said first and second jaw members are in said set position whereby actuation of said trigger means releases said first and second jaw members, thereby allowing said second jaw member to follow said first jaw member to said sprung position wherein said bag means covers any animal trapped.

2. The animal trap as set forth in claim 1, wherein said spring means is held under tension in said set position of said trap by said first generally U-shaped jaw member.

3. The animal trap as set forth in claim 2, wherein said spring means is a coil spring operatively coupled between the said baseboard and the said first generally U-shaped jaw member.

4. The animal trap as set forth in claim 1, wherein said second generally U-shaped jaw member is larger than said first jaw member whereby said bag means completely surrounds said first jaw member when said trap is in said sprung position.

5. The animal trap as set forth in claim 4, additionally comprising a floor member secured to one end of said planar baseboard means and extending slightly beyond the rest position of said second generally U-shaped member when the trap has been sprung, so as to form a support and closure over said bag means.

6. The animal trap as set forth in claim 1, wherein said bag means extends between parallel legs said generally U-shaped second jaw member has sufficient material to completely envelope a trapped animal.

7. The animal trap as set forth in claim 6, wherein said bag means is made of opaque plastic material.

8. The animal trap as set forth in claim 1, wherein said spring means operative between said first and second generally U-shaped members includes an end portion extending outwardly in a direction parallel to said pivot axes and underlies said first and second jaw members, causing movement thereof when said trap is sprung.

9. An animal trap having a planar baseboard with a first generally U-shaped jaw member having an end thereof pivotally mounted to said baseboard about a pivot axis substantially parallel to the plane of the baseboard, a spring operatively connected between the baseboard and the jaw member for urging the jaw member towards a sprung position in which a cross-bar section of the generally U-shaped jaw member engages the baseboard on one side of the pivot axis, a trigger arm pivotally mounted to the baseboard on the opposite side of the pivot axis from said one side and engaging a bait pedal pivotally mounted to the baseboard on said one side of the pivot axis, the trigger arm extending in a set position over the cross-bar section of the U-shaped jaw member, across the pivot axis with the free end of thereof engaging an engagement surface on the bait pedal to retain the U-shaped jaw member in the set position and whereby the depression of the bait pedal releases the free end of the trigger arm from the engagement surface to release the U-shaped jaw member, the trap further comprising:

a second generally U-shaped jaw member pivotally mounted to the baseboard about said pivot axis, said second jaw member having a cross-bar section extending outwardly of said pivot axis a distance further than the cross-bar section of the first U-shaped jaw member;

bag means attached to said second generally U-shaped member and extending between parallel legs thereof, said bag means having an outer surface adjacent the baseboard means when said second jaw member is in the set position and wherein the first jaw member overlies an inner surface of said bag means in the set position; and means for urging said second jaw member from the set position to the sprung position upon release of the first jaw member by said trigger arm whereby said bag means covers any animal caught in the trap by the first U-shaped jaw member.

10. The animal trap as set forth in claim 9, additionally comprising a floor member secured to one end of said planar baseboard means and extending slightly beyond the rest position of said second generally U-shaped member when the trap has been sprung, so as to form a support and closure over said bag means.

* * * * *